Patented May 3, 1938

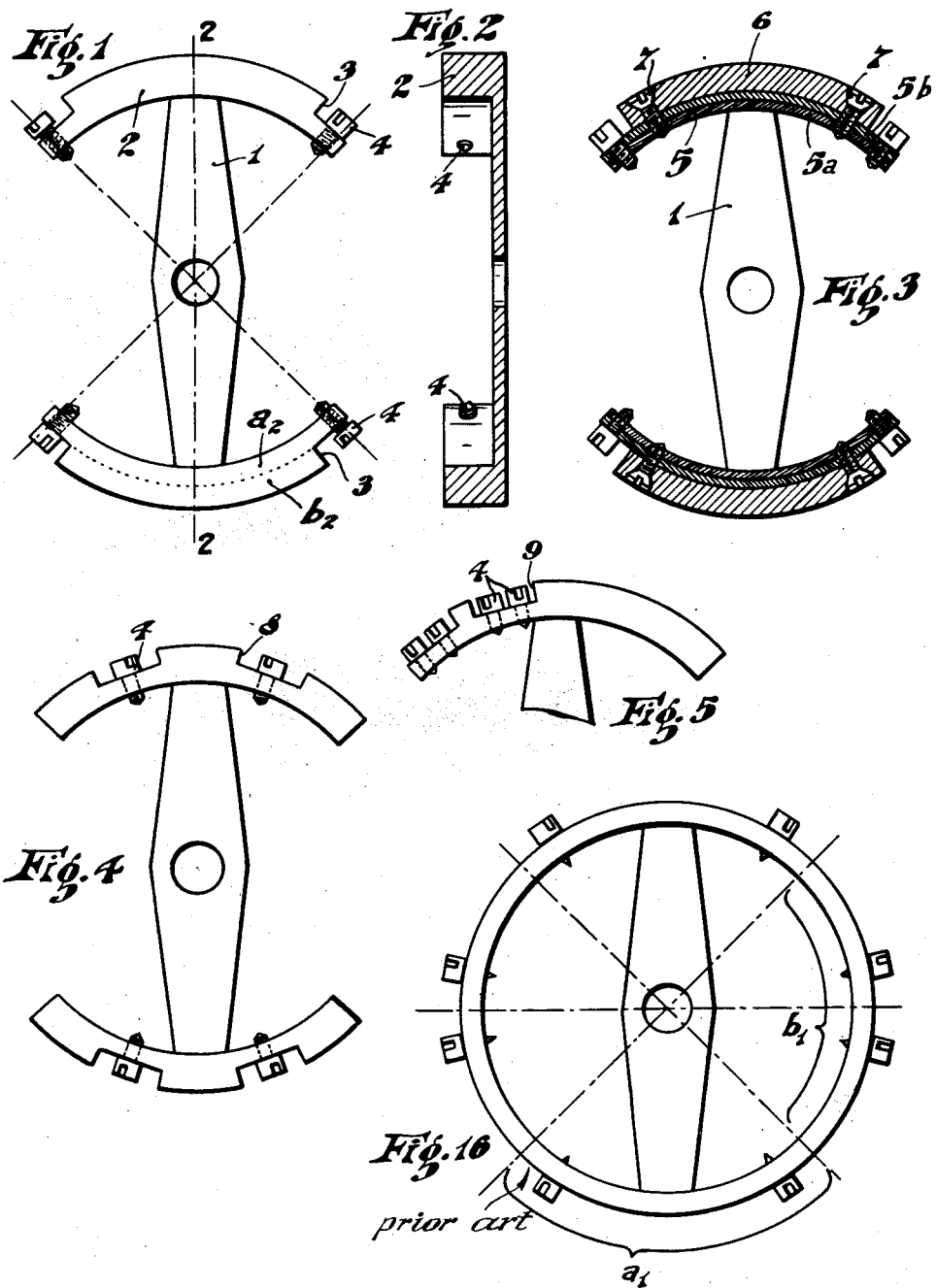

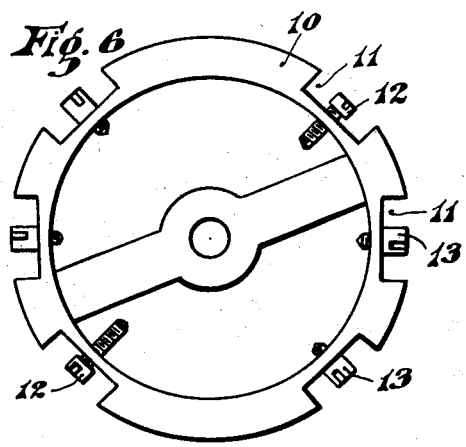
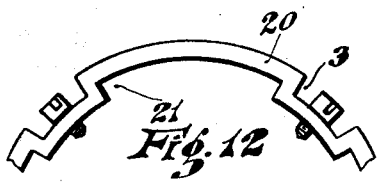
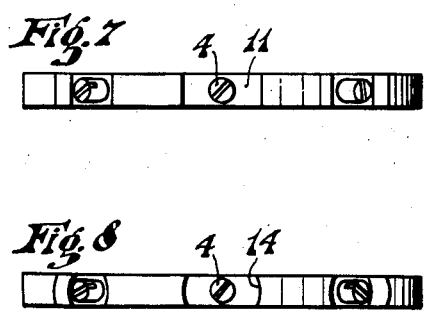
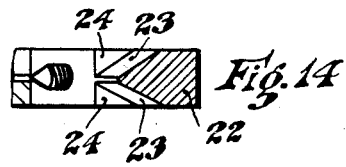
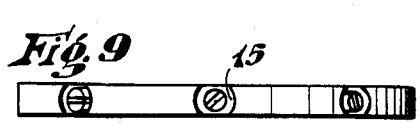
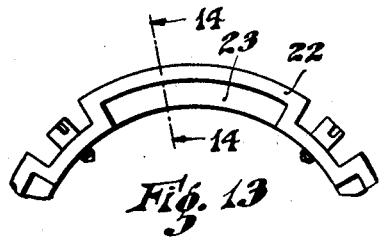

2,116,257

UNITED STATES PATENT OFFICE 2,116,257

BALANCE WHEEL

Hermann Aegler, Bienne, Switzerland

Application October 7, 1936, Serial No. 104,512
In Switzerland November 21, 1935

5 Claims. (Cl. 58—107)

This invention relates to balance wheels of the type having a rim carrying regulating screws which are screwed into the rim in radial direction, and particularly to balance wheels having a small number of such screws, for instance two to eight screws, the heads of which cover a small fraction only of the total circumference of the rim of the wheel.

The object of the invention is the provision of a balance wheel of the above type having an improved distribution of the mass of the rim.

The invention consists in a balance wheel having a rim provided with recesses along the external periphery thereof, the recessed portions being provided with the holes for receiving the radially disposed regulating screws the heads of which are lodged in the openings formed by the recessed portions of the rim.

The accompanying drawings show various preferred embodiments of the invention.

Figure 1 is a plan view of a balance wheel according to the invention.

Figure 2 is a section along the line 2—2 of Fig. 1.

Figure 3 is a horizontal section through the rim of a modified balance wheel according to the invention.

Figure 4 is a plan view of a further embodiment of the invention.

Figure 5 is a plan view of a portion of a balance wheel according to a further embodiment.

Figure 6 is a plan view of a still further embodiment of the invention.

Figures 7, 8 and 9 show each a side elevation of a balance wheel embodying certain modifications of details.

Figures 10 and 11 are fragmentary plan views of modified balance wheel rims.

Figures 12 and 13 are fragmentary plan views of two further embodiments of balance wheels according to the invention.

Figure 14 is a section along the line 14—14 of Fig. 13.

Figure 15 is a similar section across a modified balance wheel rim.

Figure 16 is a plan view of an ordinary balance wheel shown for purposes of comparison with the balance wheels according to the invention.

The balance wheel shown in Figs. 1 and 2 comprises an arm 1 carrying at each end a rim portion 2 extending through an arc of 90° and disposed symmetrically relative to the longitudinal axis of the arm 1. Both ends of the two rim portions 2 are provided with a recess 3 in which are lodged the heads of the regulating screws 4. These heads are of a size so as not to project beyond the outer circumference of the rim portions 2. The sectional area of the rim portions 2 is sufficiently large so that the weight of the material of the two rim portions is equal to the weight of the entire rim of a balance wheel according to Fig. 16 which has the same external diameter as the wheel according to Fig. 1. The internal portion $a_2$ of the rim 2 in Fig. 1 corresponds to the portion $a_1$ of rim of the wheel in Fig. 16, while the external portion $b_2$ of the rim 2 in Fig. 1 can be considered as corresponding to the portion $b_1$ of the rim of the wheel in Fig. 16 which would have been cut out and secured to the outer surface of the portion $a_1$. The weight of the material of the rim of the wheels according to Fig. 1 and to Fig. 16 being the same, it can however be seen, that the mean distance of the mass from the center of the wheel is greater for the rim according to Fig. 1 than for the rim according to Fig. 16. Consequently the balance wheel according to Fig. 1 has a greater moment of inertia, while the external diameter and the weight are the same as those of the wheel according to Fig. 16. The regulating qualities of the balance wheel according to the invention are accordingly improved and the aerodynamical qualities also. Since the two rim portions 2 are relatively thick, the resistance of the wheel against deformation is increased, and particularly a deformation owing to the centrifugal force is impossible. The manufacture of the balance wheel is facilitated, and since the rim portions cover only one half of the circumference, the spiral spring can be more easily observed when the escapement must be inspected, and particularly the play between the spiral spring and the arm of the balance wheel can be controlled.

In the modification according to Fig. 3 the two rim portions comprise two distinct pieces 5 and 6, the external piece 6 being secured by means of screws 7 to the piece 5 carried by the arm 1. The internal piece 5 is composed of two layers $5a$ and $5b$ of different metals for compensating the effects of variation of temperature.

The balance wheel of Fig. 4 shows a different disposition of the recesses 8 for receiving the heads of the regulating screws 4.

In Fig. 5, each recess 9 of the rim 2 contains two regulating screws 4.

The balance wheel according to Fig. 6 comprises an entire closed rim 10 provided with a number of recesses 11. Certain of these recesses carry screws 12 the radial position of which may be adjusted for regulating purposes, and the other recesses carry screws 13 screwed tightly on the rim. These latter screws can serve to secure washers to the rim in case the moment of inertia must be increased for effecting regulating corrections which are too considerable to be made by the screws 12.

In Fig. 7 the recesses 11 of the rim have plane end faces extending at right angles to the plane of the wheel. The recesses are sufficiently large to permit gripping of the heads of the screws 4 with tweezers.

In Fig. 8 the end faces 14 of the recessed portions are cylindrical and their axes coincide with the axes of the screws 4. In Fig. 9 the recesses 15 are just large enough to receive the head of a screw, in order to render the rim as heavy as possible, while the screw head can still be gripped with tweezers from above and below the rim.

In Fig. 10 the head of the screw 16 slightly projects beyond the periphery of the rim 10. In Fig. 11, the head of the screw 17 is rounded and the edges of the recess 18 in the rim 19 are also rounded in order to decrease the resistance offered by the air against the movement of the wheel.

In Fig. 12 the rim 20 has been made lighter than that shown in Fig. 6 by providing recesses 21 on the inner side of the rim between two screws. The weight of this balance wheel can be equal to that of a wheel having a truly circular rim and in which the external diameter measured on the heads of the screws projecting beyond the rim is the same, but the moment of inertia of the wheel according to Fig. 12 is greater. The bottom of the recesses 3 containing the screw heads is cylindrical.

In Figs. 13 and 14 the rim 22 comprises bevelled faces 23 so as to form two recesses 24 on the upper and on the lower face of the rim between two screws. In Fig. 15 the lower face only of the rim is bevelled as indicated at 25.

The pivot pins of balance wheels for small watches are much more resistant relatively to those of balance wheels for big watches for the following two reasons: 1. Since the length of the pivot pin is proportional to its diameter, the bending stress which the pin can support is proportional to the square of its diameter, while the weight of the balance wheel is proportional to the cube of the wheel diameter. 2. The pivot pin of small balance wheels is relatively greater than the pivot pin of a big balance wheel. On the other hand the regulating quality of a balance wheel provided with a spiral spring is the greater, the smaller is the ratio between the dissipated energy during an oscillation and the total energy of an oscillation.

The total energy of an oscillation is proportional to the square of its amplitude and to the moment of inertia which is the product of the mass divided by the square of the radius of gyration. As in horology the greatest technically admissible amplitude is used, it suffices to consider here the effects of the mass and of the radius of gyration on the friction of the pivots and on the energy of the oscillation, and the effect of the distribution of the mass, abstraction being made of the density which evidently influences this distribution.

In the design of a certain type of watch movement, care is always taken, for the above reasons, to lodge a balance wheel the moment of inertia of which is as great as possible. But a limit is given by the space of which one can dispose and by the amount of energy which can be transmitted to the balance wheel from the spring motor. It is also admitted that the value of the amplitude is more than three quarters of one turn when the spring motor is fully energized.

An ordinary balance wheel shall now be considered in which the regulating screws are projecting beyond the periphery of the rim, as in the case of Fig. 16. The total energy received by the balance wheel during one oscillation thereof is also dissipated during one oscillation. This total energy is equal to $$I\left(\frac{2\pi}{t}\right)^2\frac{A^2}{2}$$

in which expression $I$ indicates the moment of inertia, $t$ the period and $A$ the amplitude. It will be understood that the balance wheel according to Fig. 12 can have the same diameter and the same weight as the wheel according to Fig. 16 with projecting screw heads, but that its moment of inertia will be greater because a considerable portion of the rim is situated at a greater distance from the axis, and that the resistance offered by the surrounding air will be at least not greater than for the ordinary balance wheel, so that the wheel according to Fig. 12 will have the same amplitude for the same energy of entertainment. But since the moment of inertia is increased, the regulating quality has also increased in the same proportion. In case the resistance offered by the air would be decreased, the mass of the rim could be increased, for instance by using a rim as shown in Figs. 13 to 15; in this manner the moment of inertia would be still further increased and the regulating quality improved.

When adopting the entire solid rim according to Figs. 6 to 9 the weight and the moment of inertia is still further increased relative to Fig. 13. The radius of gyration can then be a little smaller than for the wheels according to Figures 12 to 15, according to the height which will be given to the arm of the wheel, but it will still remain at least as long as in the case of the best balance wheels having screw heads projecting beyond the rim, in which the length of the radius of gyration is 83% of the extreme radius measured over the screw heads, while in the case of Fig. 9 the radius of gyration is 85% to 86% of the external radius, and the internal radius is 80% of the external radius as in Fig. 6. Since the mass between two recesses of the rim is evidently greater than the mass of a corresponding rim portion in an ordinary balance wheel, even if eighteen screws are provided, it can be recognized that a considerable improvement has been realized over ordinary balance wheels having the same density.

The balance wheel having an entire rim according to Figs. 6 to 10 will be used where only a space of small diameter is available for lodging the wheel.

In addition to the physical advantages obtained with the balance wheels according to the invention these wheels show a great rigidity, providing easier manufacturing and handling of the same, and have fewer projecting and uneven portions to which foreign bodies, for instance dust or the like can cling.

I claim:—

1. A balance wheel having a rim carrying regulating screws, said rim being provided with at least four spaced recesses along the outer periphery thereof, the recessed portions of the rim having radially directed threaded holes, said regulating screws having a threaded shank engaged in the hole of the rim and a head of larger diameter than the shank and lodged in said recess in the rim, the length of the recesses in the rim in circumferential direction being considerably greater than the diameter of the screw heads, to permit insertion of a screw head engaging pliers into the recess.

2. A balance wheel having a split rim forming two symmetrically disposed rim portions, each rim portion being provided with at least two spaced recesses along the outer periphery thereof, the recessed portions of the rim having radially directed holes, regulating screws having a threaded shank engaged in the hole of the rim and having a head of larger diameter than the shank and lodged in said recess in the rim, the length of the recesses in circumferential direction being considerably greater than the diameter of the screw heads, to permit insertion of a screw head engaging pliers in the recess.

3. A balance wheel having a rim carrying regulating screws, said rim being provided with spaced recesses along the outer periphery thereof, the recessed portions of the rim having radially directed threaded holes, said regulating screws having a threaded shank engaged in the hole of the rim and a head of larger diameter than the shank and lodged in said recess in the rim, the length of the recesses in the rim in circumferential direction being considerably greater than the diameter of the screw heads, and the portions of the rim situated between two of said recesses on the outer periphery of the rim being recessed along the inner periphery thereof.

4. A balance wheel having a rim carrying regulating screws, said rim being provided with spaced recesses along the outer periphery thereof, the bottom of said recesses being traversed by radially directed threaded holes, said regulating screws having a threaded shank engaged in said holes and a head lodged in said recesses of the rim, the portions of the rim situated between each two of said recesses having bevelled inner surfaces.

5. A balance wheel having a rim provided with recesses along the external periphery thereof, the inner faces of the rim situated between two successive recessed portions being internally bevelled, the recessed portions of the rim having radially directed holes, and regulating screws screwed into said holes from the external side of the rim whereby the heads of said regulating screws are lodged in the recesses of the rim.

HERMANN AEGLER.